(12) United States Patent
Beck

(10) Patent No.: US 6,671,273 B1
(45) Date of Patent: Dec. 30, 2003

(54) METHOD FOR USING OUTGOING TCP/IP SEQUENCE NUMBER FIELDS TO PROVIDE A DESIRED CLUSTER NODE

(75) Inventor: Paul R. Beck, Carlisle, MA (US)

(73) Assignee: Compaq Information Technologies Group L.P., Houston, TX (US)

( * ) Notice: Subject to any disclaimer, the term of this patent is extended or adjusted under 35 U.S.C. 154(b) by 0 days.

(21) Appl. No.: 09/224,189

(22) Filed: Dec. 31, 1998

(51) Int. Cl.[7] ............................ H04L 12/28; H04L 12/56
(52) U.S. Cl. ................... 370/389; 370/351; 370/352; 370/392; 370/400; 370/465; 370/466; 370/474; 370/902; 370/912; 709/227; 709/230; 709/238
(58) Field of Search ................................. 370/351, 352, 370/357, 389, 392, 400, 464, 465, 466, 474, 902, 912; 379/901; 709/102, 105, 201, 208, 227, 230, 238

(56) References Cited

U.S. PATENT DOCUMENTS

| | | | | |
|---|---|---|---|---|
| 4,799,215 A | * | 1/1989 | Suzuki | 370/60 |
| 4,815,071 A | * | 3/1989 | Shimizu | 370/60 |
| 4,884,263 A | * | 11/1989 | Suzuki | 370/16 |
| 5,371,852 A | | 12/1994 | Attanasio et al. | 395/200 |
| 5,790,546 A | * | 8/1998 | Dobbins et al. | 370/400 |
| 5,828,318 A | * | 10/1998 | Cesar | 340/825.69 |
| 5,862,348 A | | 1/1999 | Pederson | 395/200.59 |
| 5,918,017 A | | 6/1999 | Attanasio et al. | 395/200.54 |
| 5,930,259 A | * | 7/1999 | Katsube et al. | 370/409 |
| 5,996,089 A | | 11/1999 | Mann | 714/6 |
| 6,006,259 A | | 12/1999 | Adelman et al. | 709/223 |
| 6,016,319 A | * | 1/2000 | Kshirsagar et al. | 370/410 |
| 6,044,402 A | | 3/2000 | Jacobson et al. | 709/225 |
| 6,061,349 A | | 5/2000 | Coile et al. | 370/389 |
| 6,078,957 A | | 6/2000 | Adelman et al. | 709/224 |
| 6,108,708 A | * | 8/2000 | Iwata | 709/238 |
| 6,182,224 B1 | * | 1/2001 | Phillips et al. | 713/201 |
| 6,192,411 B1 | | 2/2001 | Chan et al. | 709/232 |
| 6,195,680 B1 | | 2/2001 | Goldszmidt et al. | 709/203 |
| 6,253,230 B1 | * | 6/2001 | Couland et al. | 709/203 |
| 6,266,335 B1 | | 7/2001 | Bhaskaran | 370/399 |
| 6,317,775 B1 | * | 11/2001 | Coile et al. | 709/201 |
| 6,324,177 B1 | * | 11/2001 | Howes et al. | 370/389 |
| 6,327,622 B1 | * | 12/2001 | Jindal et al. | 709/228 |
| 6,330,605 B1 | | 12/2001 | Christensen et al. | 709/226 |
| 6,335,919 B1 | * | 1/2002 | Maegawa | 370/254 |
| 6,370,584 B1 | | 4/2002 | Bestarvos et al. | 709/238 |
| 6,470,389 B1 | | 10/2002 | Chung et al. | |

* cited by examiner

*Primary Examiner*—Hassan Kizou
*Assistant Examiner*—Joe Logsdon
(74) *Attorney, Agent, or Firm*—Hamilton, Brook, Smith & Reynolds, P.C.

(57) ABSTRACT

In accordance with the present invention a method is provided for encoding connection ownership information in the sequence number field of an outgoing TCP/IP data packet header. That connection information includes the network layer address of the processor node to which the packet is associated. With such an invention, the connection registration database is only updated after 32 megabytes have been transferred across that connection. Because fewer data packets are being registered in the connection registration database, sufficient time is allowed for registering other connections in background operations. Further, connections that do not send more than 32 megabytes of data never need to be registered.

29 Claims, 5 Drawing Sheets

METHOD FOR USING OUTGOING TCP/IP SEQUENCE NUMBER FIELDS TO PROVIDE A DESIRED CLUSTER NODE

BACKGROUND OF THE INVENTION

Generally speaking, computer systems typically include one or more central processor nodes, referred to simply as "processor nodes" or "nodes". Each of those processor nodes includes one or more network interface modules, connected to a computer network, for communicating with other processor nodes. Each network interface module has an associated network layer address or IP address to which packets of information are directed. The network layer address allows processor nodes to communicate with one another by sending those packets of information across the computer network. Each packet includes a header that contains the network layer addresses of the originating, or source, processor node and of the destination processor node.

Groups of processor nodes can be connected in an arrangement referred to as a "cluster". Generally, processor nodes within a cluster are more tightly coupled than in a general network environment and act in concert with one another. For example, all of the processor nodes within a cluster can share a common file system such that they are able to access the same files. Also, each of the processor nodes within the cluster can use the same security domain files such that the same user name and password may be utilized to log on to any of the processor nodes.

A cluster should appear as a single processor node to clients accessing that cluster. In other words, a cluster should present a common set of software services that can be executed by any of the associated processor nodes. Therefore, regardless of which processor node is accessed by a client, the same services will be provided. In such a manner, processor nodes can be seamlessly added to the cluster to increase the capacity of those services without the cluster looking any different to the client.

To make a cluster appear to be a single processor node, it should have a single network layer address. That network layer address should not be tied to one specific node within the cluster but rather should be collectively associated with all the processor nodes. To that end, the cluster's network layer address must be accessible regardless of what the current membership of the cluster is. The current membership of a cluster is defined by the nodes that are "up" and capable of running the software services required by any client accessing the cluster. Accordingly, a client accessing the cluster over a network does not need to know which nodes within the cluster are currently up and running in order to access the software services that the cluster provides. Such a network layer address is referred to as a "cluster alias address". In order to direct incoming data packets, each processor node within the cluster has the ability to distribute those packets to the appropriate processor node for servicing. The processor node receiving the data packet will hereinafter be referred to as the "receiving processor node" for that transaction. When a data packet is received by the cluster, the receiving processor node determines what type of data packet it is. For example, most data packets correspond to the TCP/IP or UDP network protocols. The receiving processor node further determines whether the data packet is associated with an existing connection to an application running on one of the processor nodes within the cluster or whether a new connection must be established. Generally, when a connection is established, it means that an application running on one of the processor nodes of the cluster is dedicated to servicing data packets sent by the associated client. Also, that application can return data to the client via the connection.

If the data packet is associated with an existing connection to a processor node within the cluster, the receiving processor node performs an operation for determining the identity of that processor node. To that end, data packets typically include a header portion that contains information about the existing connection to which it is associated. That header portion includes the network layer address of the processor node from which it was sent, the TCP port number of the application from which it was sent, the network layer address of the destination processor node, or in this case the cluster alias address, the TCP port number of the application running on the destination processor node and the protocol type to which the data packet conforms. The receiving processor node maintains a look-up table of that information for each existing connection within the cluster. That look-up table is referred to as the "connection registration database" or CRD. Each time a new connection is established, the details of that connection must be registered in the connection registration database of every node in the cluster. This is because as packets move across the network they may be initially directed to different nodes within the cluster. Registering each such connection, as it is generated, across multiple nodes in the cluster presents an untenable amount of overhead. That overhead is particularly detrimental in highly active computer systems such as web servers.

Accordingly, a method is needed for providing connection information to a receiving processor node, within a cluster, without the need for that information to be synchronously registered in the connection registration database of every cluster node at the time the connection is created.

SUMMARY OF THE INVENTION

The foregoing problems of registering connection information in a connection registration database are overcome by the present invention. In accordance with the present invention, a method is provided for encoding connection information in the sequence number field of an outgoing TCP/IP data packet header. That connection information includes the identity within the cluster of the processor node to which the packet is associated. With such an invention, a connection registration database is only updated after a relatively large amount of data has been transferred across a connection. Connections that do not send more than that amount of data do not need to be registered. Accordingly, overhead operations associated with registering connection information are minimized.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not meant to limit the invention to particular mechanisms for carrying out the invention in practice, but rather, are illustrative of certain ways of performing the invention. Other ways of performing the invention will be readily apparent to those skilled in the art.

DETAILED DESCRIPTION OF THE INVENTION

Generally, the present invention provides a method for encoding connection information in the sequence number field of an outgoing TCP/IP data packet header. That connection information includes an identification number, referred to as the Host ID, of the processor node to which the packet is associated. With such a header of the present invention, the connection registration database is only updated after a large, predetermined number of bytes have been transferred across that connection and therefore fewer connections are registered in the connection registration database. Additionally, when registration does occur it may be performed as a background activity, allowing multiple connections to be batched together and registered in a single operation. Accordingly, the overhead operations utilized to register those connections in the connection registration database are also minimized.

I. SINGLE PROCESSOR NODE

Figure 1:
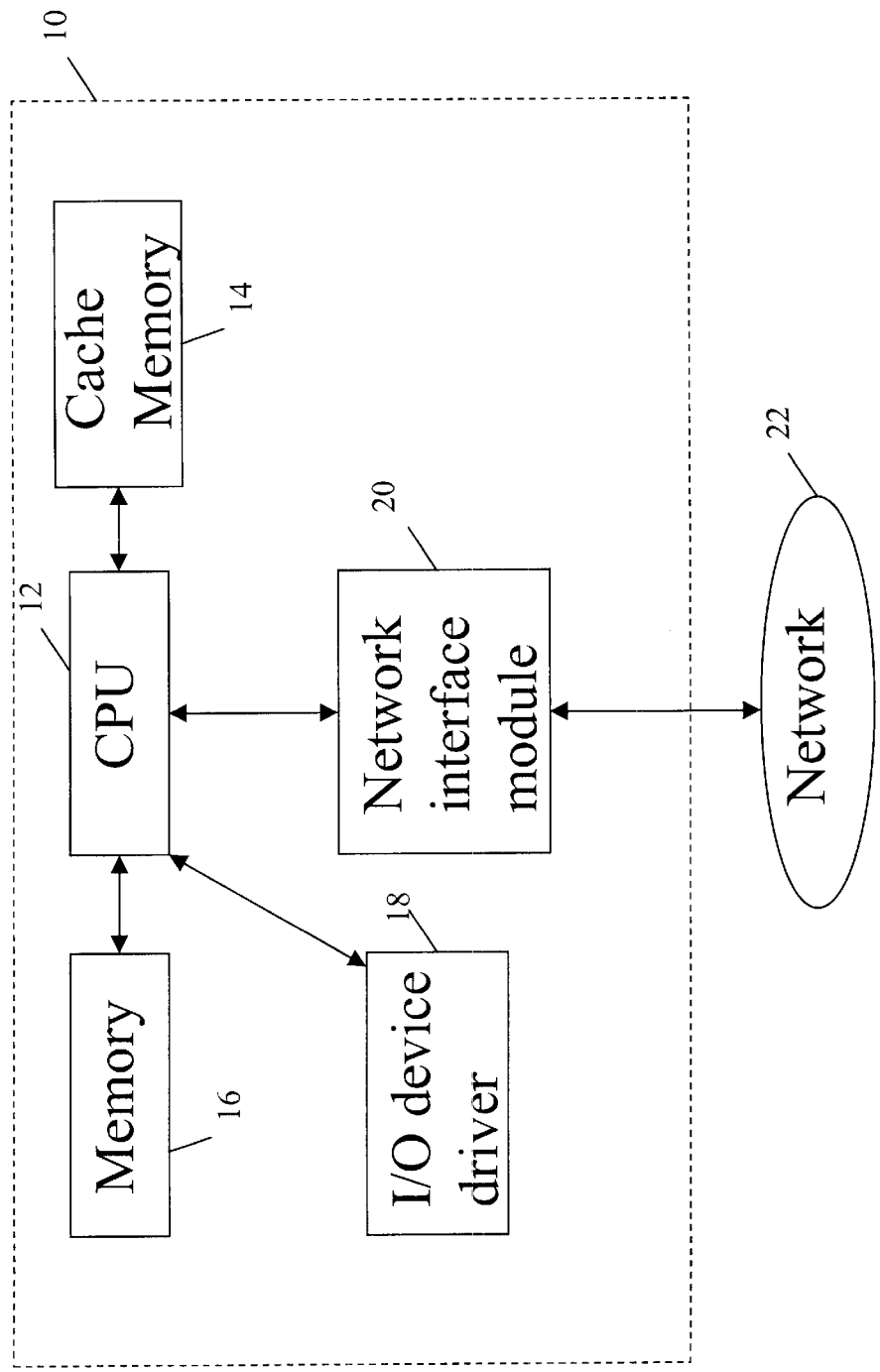
FIG. 1 is a schematic drawing of a single processor node coupled to a network.

Referring now to the drawings, FIG. 1 illustrates a single processor node 10. The processor node includes a central processing unit (CPU) 12 coupled to a cache memory 14, a main memory 16 and an I/O device driver 18. The processor node 10 is coupled to a computer network 22 via network interface module 20. The network interface module 20 has an associated network layer address to which packets of information, transferred on the computer network by other processor nodes, can be directed. The network layer address therefore allows remote processor nodes to communicate with one another through the passing of packets of information across the computer network 22. Each packet includes a header that contains the network layer addresses of the originating processor node and of the destination processor node, for identification purposes.

II. CLUSTERS OF PROCESSOR NODES

Figure 2:
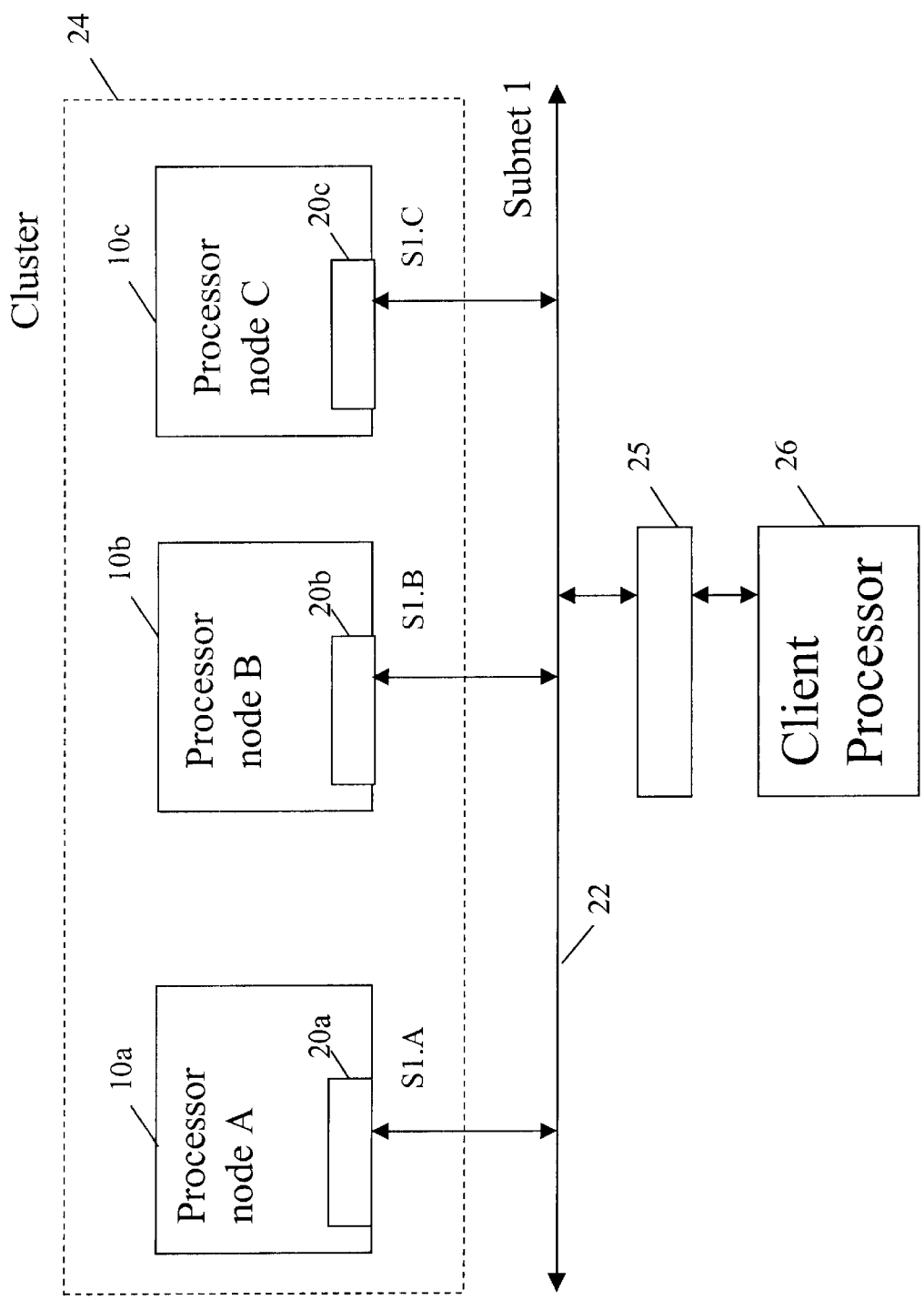
FIG. 2 is a schematic drawing depicting a number of processor nodes of FIG. 1 arranged in a cluster.

Referring now to FIG. 2, a group of processor nodes are shown connected in an arrangement referred to as a "cluster" 24. A cluster 24 is a collection of processor nodes tightly coupled via a computer network and acting in concert with one another. Processor nodes 10a–10c are shown connected together via network interfaces 20a–20c and via the computer network 22. The indicated portion of computer network 22 is referred to as a subnet, and in this case "subnet 1". Each of the processor nodes 10a–10c are referred to as Processor nodes A–C and, for illustration purposes, have thirty-two bit network layer (or IP) addresses S1.A, S1.B and S1.C, respectively. Further, a client processor node 26 is also shown connected to computer network 22 via an intermediate connection module 25.

Cluster 24 is associated with a single network layer address such that it appears as a single processor node to a client 26 located outside the cluster, i.e. on the other side of connection module 25. That network layer address is associated with all the processor nodes 10a–10c in the cluster 24 and is referred to as a "cluster alias address". Using the cluster alias address, data packets can be directed to a specific cluster of processor nodes. However, the cluster alias address does not specify the processor node within the cluster to which the data packet should be directed.

III. DATA TRANSFER VIA CONNECTIONS

Data packets that are transferred between processor nodes of different clusters are typically associated with a virtual circuit referred to as a connection. A connection is a construct that is established by both the source processor node and the destination processor node for exchanging data via data packets. More specifically, the connection is established by applications running on the source and destination processor nodes.

In order to direct incoming data packets to the processor nodes that have established connections with the source applications for those data packets, each processor node has the ability to distribute data packets within the cluster. The processor node within the cluster receiving the data packets from the network will hereinafter be referred to as the "receiving processor node." For illustration purposes, assume that a data packet is received by processor node 10b. Processor node 10b first reads the data packet's associated header to determine which protocol the data packet corresponds. For example, most data packets correspond to the TCP/IP or UDP network protocols. Each protocol specifies an arrangement of header information that delineates the source and destination of the packet.

Figure 3:
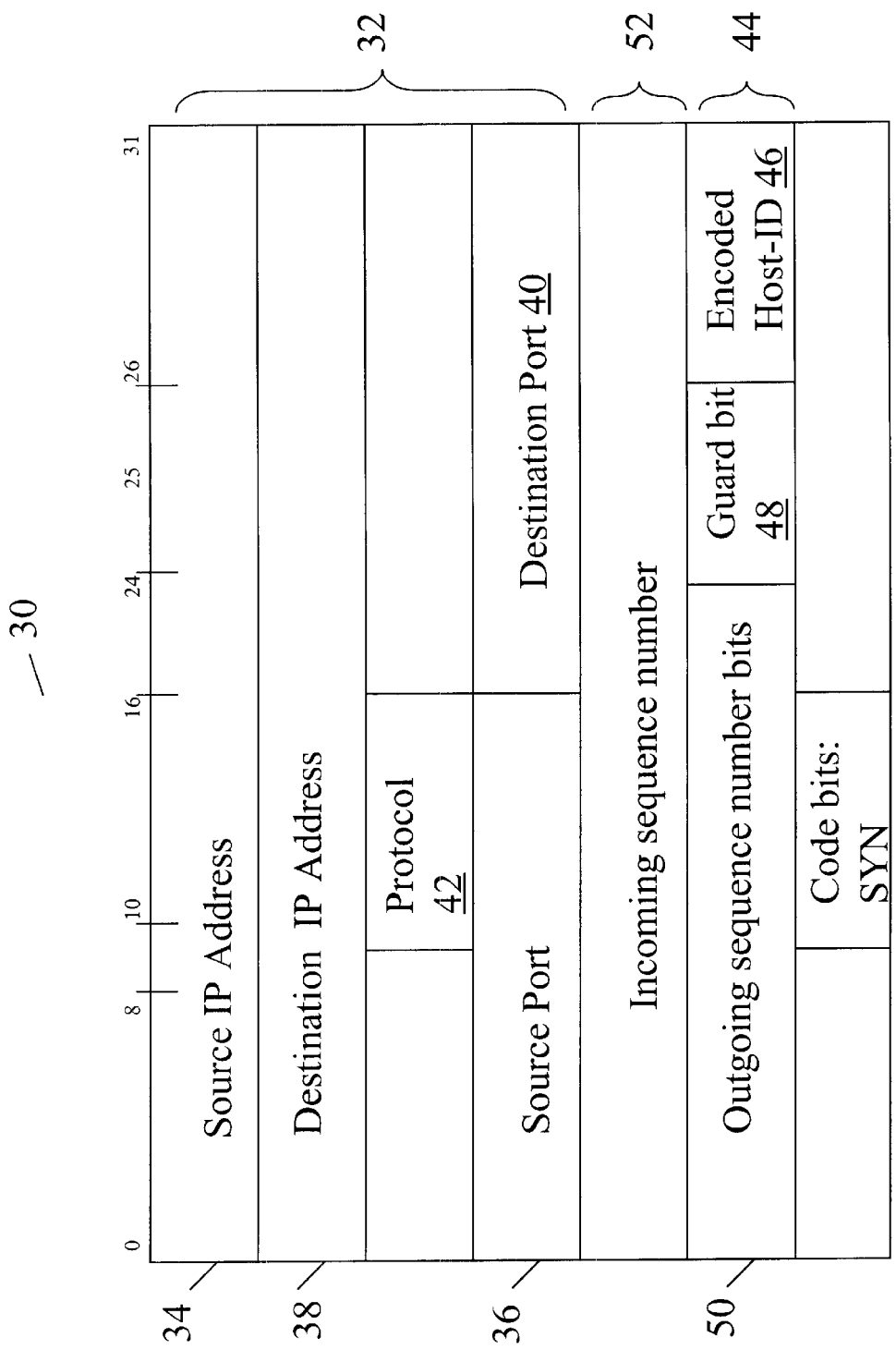
FIG. 3 is a block diagram of a TCP-IP packet header according to the invention.

Referring now to FIG. 3, the configuration of a TCP/IP header according to the present invention is depicted. TCP/IP data packets that arrive at cluster 24 include a header portion 30 which contains information regarding an associated connection to a processor node if such connection exists. In the first portion 32 of TCP/IP header 30, the aforementioned connection is identified by several fields, collectively referred to as the "five-tuple". The source IP address field 34 identifies the thirty-two bit network layer address of the processor node, or cluster, that sent the associated data packet to the receiving cluster 24. The destination IP address field 38 identifies the thirty-two bit network layer address of the intended destination processor node or cluster. The next portion of the TCP/IP header 30 is referred to as the source port field 36. The source port field 36 identifies the TCP port number for the application on the source processor node that generated and sent the data packet. The source port field 36 contains a port number that is assigned only for as long as the connection exists. When the connection is closed, such as when an entire data file has been successfully transferred, the source port number is deallocated and returned to a repository of available port numbers. Likewise, the TCP port number used by the application running on the destination processor node is stored in the destination port field 40. Finally, the protocol being used by the associated data packet is represented by an eight bit value that is stored in the "Protocol" field 42.

It will be recognized by one of ordinary skill in the art that prior art approaches store each element of the five tuple in connection registration databases associated with each processor node within the cluster. The five-tuple is stored each time an associated connection is established. The overhead associated with that approach is significantly diminished according to the present invention.

IV. SEQUENCE NUMBER FIELDS

The TCP/IP header 30 includes an incoming sequence number field 52 and an acknowledgment, or outgoing sequence number field 44, collectively referred to as the "sequence number fields." (It should be noted that the terms "incoming" and "outgoing" are used in reference to the direction that data packets are sent with respect to the cluster 24.) The sequence number fields 52 and 44 are typically used to order data packets that are associated with a fragmented data transfer. In addition, the sequence number fields 52 and 44 are used to confirm that all such data packets successfully arrived at the destination processor node. More specifically, data to be transferred from one processor node to another will be fragmented into many data packets that are independently transferred. Sequential numbers are stored in the sequence number fields 52 and 44 of each data packet header to indicate the relative position of that data packet within the transfer. Although some packets may arrive at the destination processor node out of order, the total number of data packets must arrive for a successful data transmission to occur. By monitoring the sequence numbers from the sequence number fields 52 and 44 of each data packet, a destination processor node can determine whether all the data has been transferred that was intended to be transferred.

The sequence numbers referred to above do not typically begin at zero, as would be expected. The source node, from which each data packet originates, determines an initial value to be stored in the sequence number field of the first data packet to be transferred. Typically, such a data transfer is part of an ongoing dialogue between a client and a processor node of the cluster. Accordingly, the client 26 is the source for the data transferred to the cluster 24 and the processor node 10 within the cluster 24 is the source for the data transferred to the client 26. Each of those data transfers is associated with respective independent sets of sequence numbers. When a new connection is requested from the client 26 to the cluster 24, the initial value is chosen by the client 26 and stored in the incoming sequence number field 52. When this connection is acknowledged from the cluster 24 to the client 26, the processor node 10 within the cluster 24 chooses the initial value and stores it in the outgoing sequence number field 44 of the associated data packet. As data is transferred within the established connection, the cluster 24 or client 26 increments the appropriate sequence number field 52 or 44 is incremented from that initial value in relation to the amount of data that is being transferred therein.

According to the present invention, a six bit Host ID indicates the processor node 10a, b, or c within the cluster 24 that is associated with a specified data packet. The Host ID is encoded in an appropriate field 46 of the outgoing sequence number field 44 of the TCP/IP header 30 for that data packet. A first portion of the outgoing sequence number field 44 contains the outgoing sequence number bits 50. The outgoing sequence number bits 50 comprise bits 0 through 24 of the sequence number field 44. A guard bit field 48, is positioned immediately before the encoded Host ID field 46. The guard bit field 48 is used to identify when the sequence number has been incremented to a sufficiently large value that the sequence number bits 50 are within a predetermined range of overwriting the Host ID field 46 containing the encoded Host ID of the source processor node 10.

Each time that a data packet is sent from the processor node 10 within the cluster 24, the associated outgoing sequence number field 44 is incremented by the number of bytes of data included in the previously transferred data packet. Therefore, the sequence number identifies the position of a given data packet relative to the overall data transfer. When the outgoing sequence number field 44 reaches a predetermined value such that the guard bit changes from a logical 0 to a logical 1, the source processor node 10 knows that the encoded Host ID will be overwritten within a determinable number of transferred data bytes. That calculable number is dependent upon the number of bits in the outgoing sequence number field 44 that are located prior to the first bit of the encoded Host ID field 46. For example, the sequence number field 44 of the present illustration includes twenty-four bits prior to the guard bit field 48 and twenty-five bits prior to the first bit of the encoded Host ID field 46. Therefore, the guard bit field 48 is set when the sequence number is incremented to 0×200 0000 or greater. In other words, if the sequence number was initialized to one, the guard bit field is set when thirty-two megabytes of data have been transferred via the associated connection. The twenty sixth bit, i.e. the first bit of the Host ID field 46, will not be overwritten until another thirty-two megabytes of data have been transferred.

It should be noted that when the processor node encodes the Host ID in the outgoing sequence number field 44, it initializes a counter to the number of bytes that will cause the guard bit to set. Every time that an associated data packet is issued, the counter is decremented by the number of bytes contained therein. When the counter is decremented to zero, the processor node knows that the guard bit has been set. When the guard bit field 48 is set, the destination processor node will initiate a background operation to register the 5-tuple of the associated connection along with its Host ID in the connection registration database. In this manner, the Host ID of the destination processor node is preserved.

When the client 26 receives the data packet and is ready to transfer more data to the destination processor node 10 in the cluster 24, it increments the incoming sequence number from the received data packet Also, the client 26 copies the value stored in the outgoing sequence number field 52 of the received packet to the header 30 of the new packet to be transferred. Accordingly, when the receiving processor node 10 receives that data packet, the Host ID encoded in respective field 46 of the outgoing sequence number field 44 will indicate the processor node 10 within the cluster 24 that should receive it.

V. HANDLING OF OUTGOING DATA PACKETS

Figure 4:
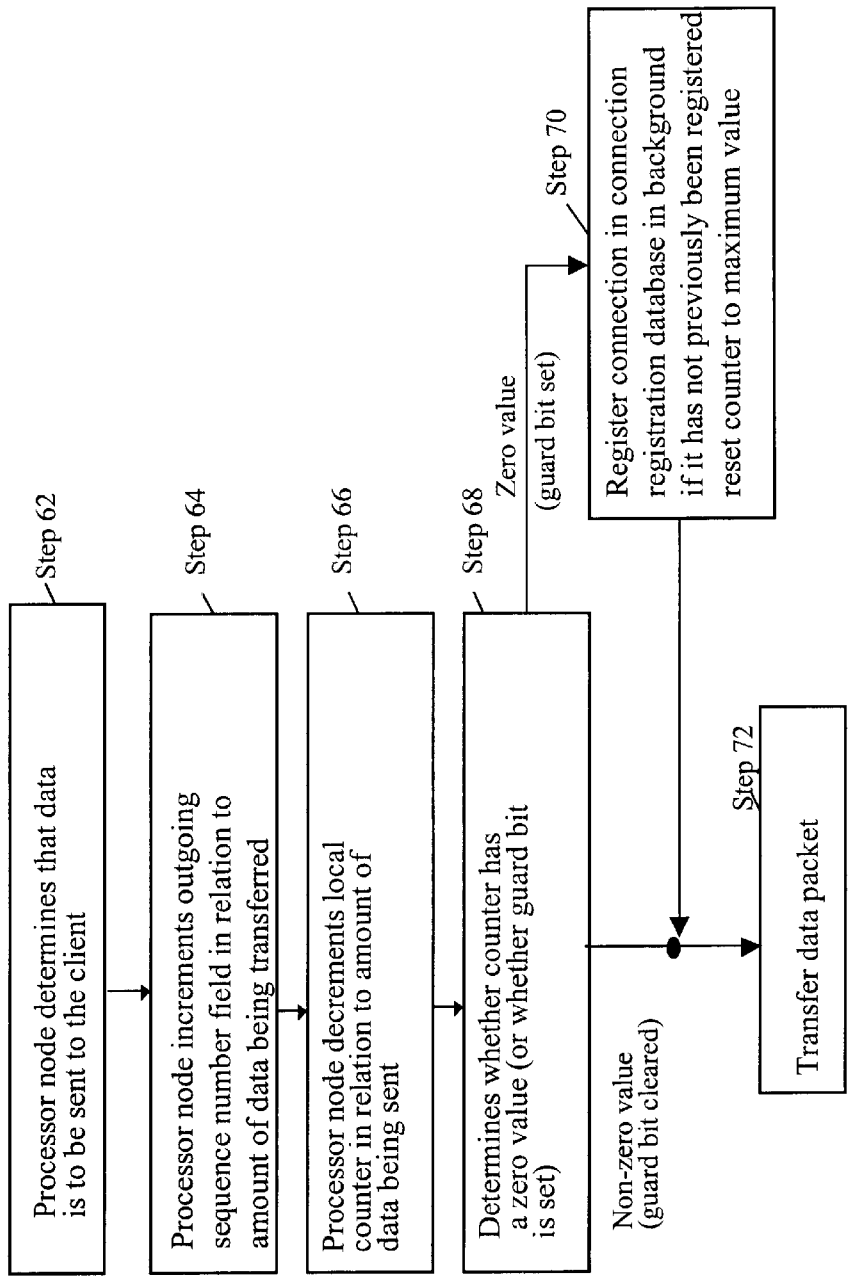
FIG. 4 is a flow diagram depicting a method of the present invention running on the cluster of FIG. 2.

Referring now to the flow diagram of FIG. 4, the handling of an outgoing data packet from a processor node within the cluster 24 to a client 26, is illustrated. The processor node 10 initially determines that data is to be sent to the client 26 (Step 62). The outgoing sequence number field 44 is incremented based on the amount of data that will be transferred (Step 64). The processor node 10 decrements a counter that will indicate, when decremented to zero, that a predetermined amount of data has been transferred and has caused the guard bit 48 to set (Step 66). Accordingly, a determination is made as to whether the counter has been decremented to zero or has gone negative (Step 68). If the counter is at zero or below, indicating that the guard bit 48 is set, the associated connection is registered in the connection registration database (Step 70) and the local counter is reset to a maximum value. The fact that the connection has been registered is saved locally so that multiple registrations are not attempted. Once the connection is registered, the packet can be transmitted to the client 26 (Step 72). Alternatively, if the counter has a non-zero value after it is decremented, the connection does not need to be registered and the packet can be transmitted (Step 72).

VI. HANDLING OF INCOMING DATA PACKETS

Figure 5:
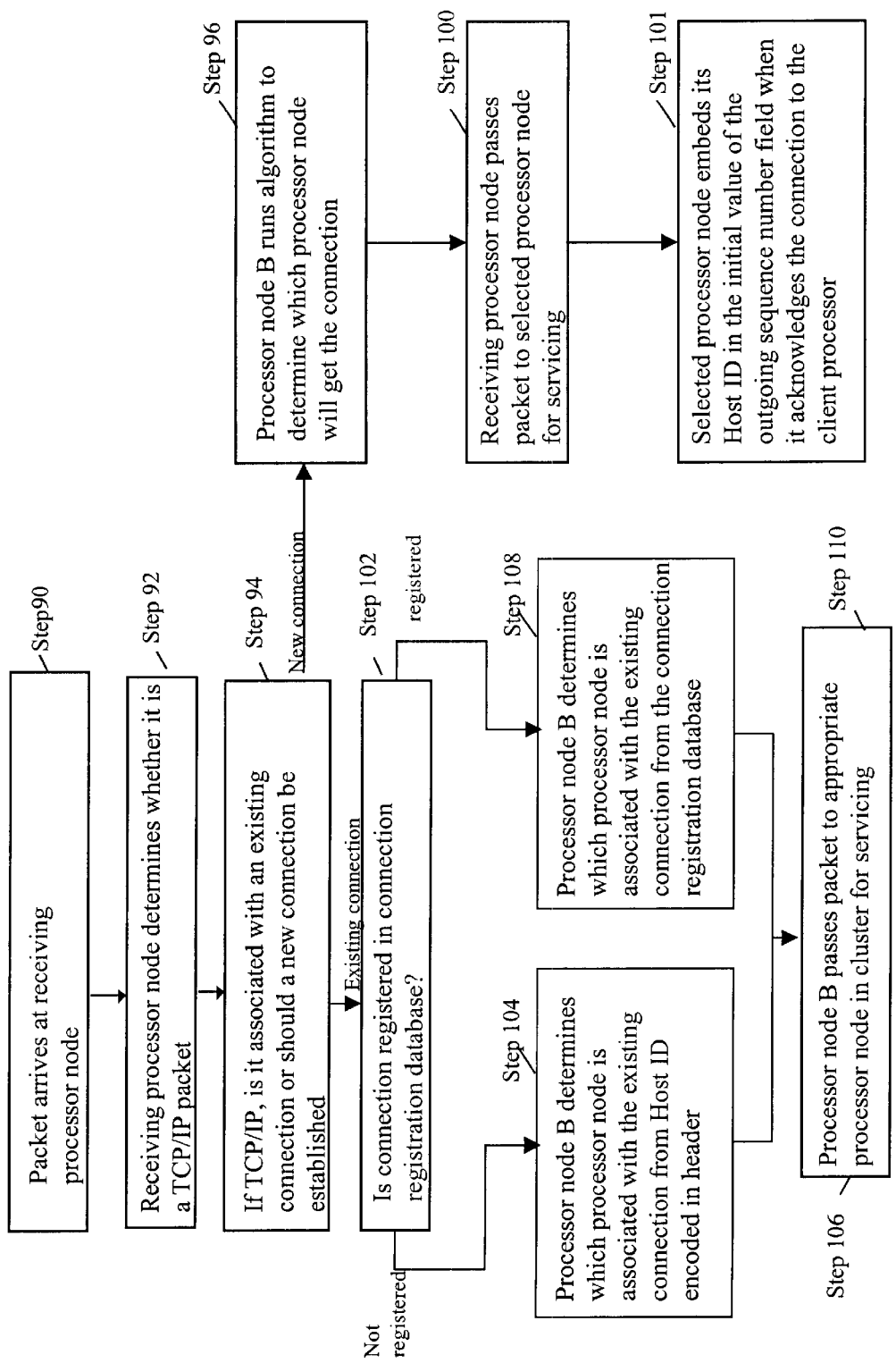
FIG. 5 is a flow diagram of the present invention's handling of an incoming data packet having the header of FIG. 3.

Referring now to FIG. 5, handling of an incoming data packet will be discussed with respect to the illustrated flow diagram. For illustration purposes, consider a TCP/IP data packet that arrives at receiving processor node 10b of cluster 24 (step 90). Receiving processor node 10b reads the header from the data packet and determines that the network protocol being used is TCP/IP (Step 92). Processor node 10b next determines whether the data packet is associated with an existing connection or whether a new connection should be established (Step 94). Assuming that the data packet is not associated with an existing connection, an algorithm is executed to determine which processor node 10, within the cluster 24, will get connected (Step 96). Thereafter, processor node 10b passes the data packet to the appropriate processor node 10 for servicing (Step 100). When the appropriate processor node 10 receives the packet, it will acknowledge the connection. As part of this acknowledgement, it fills in the initial value of the outgoing sequence number field 44. It embeds its Host ID in field 46 of the initial value, and ensures that the Guard bit 48 is initialized to zero (Step 101). It should be noted that the appropriate processor node could be processor node 10b itself.

Alternatively, assume that some processor node 10 in the cluster is acting as a client establishing an outbound connection to a server outside of the cluster and will use the cluster alias address as its Source IP address in field 34. When it sends out the initial data packet requesting the connection, it encodes its Host ID and Guard bit into the initial value of the outgoing sequence number field 44 as described above.

Assume that the transferred data packet is associated with an existing connection. As such, processor node 10b uses the five tuple portion 32 of the TCP/IP header 30 to determine if an associated connection has previously been registered in the connection registration database (Step 102). If an associated registration is not found in the connection registration database, the encoded Host ID field 46 of the sequence number field 44 is used to determine the processor node 10 to which the existing connection has been established (Step 104). Processor node 10b then transfers the packet to the appropriate processor node for servicing (Step 106).

Further, if processor node 10b determines that the existing connection has previously been registered in the connection registration database, it will retrieve the Host ID of the associated processor node 10 from the information stored in the connection registration database (Step 108). In that situation, the Host ID encoded into the Host ID field 46 of the sequence number field 44 is indeterminate and therefore cannot be used. Processor node 10b then transfers the packet to the appropriate processor node 10 for servicing (Step 110).

Accordingly, using the method of the present invention, the handling of incoming and outgoing data packets are mainly concerned with information encoded into the headers of those data packets. That information identifies an associated destination processor node that has a connection to the client application that sent the data packet. Unlike prior art approaches, the only time that the connection registration database is used for such a purpose is after a large amount of data has been transferred across that connection. Therefore, the present invention reduces the need to frequently register connection information in the connection registration database and reduces the overhead costs associated therewith.

While this invention has been particularly shown and described with references to preferred embodiments thereof, it will be understood by those skilled in the art that various form changes and details may be made therein without departing from the spirit and scope of the invention as defined by the appended claims.

What is claimed is:

1. A method for providing data packet connections in a network cluster including a plurality of processor nodes and a connection registration database, the method comprising the steps of:

forming a data packet such that the data packet includes an indication of a destination processor node of the plurality of processor nodes in the network cluster;

transmitting across a computer network, the formed data packet such that it serves as an incoming packet of information associated with a plurality of related packets of information to the network cluster;

receiving the incoming packet of information by a first processor node of the plurality of processor nodes in the network cluster; and using, from the incoming packet of information, the indication of the destination processor node to deliver the incoming packet of information from the first processor node to the destination processor node within the network cluster, in a manner such that the incoming packet of information and each of the related packets of information are delivered to the destination processor node without a connection registration overhead operation.

2. A method for providing data packet connections in a network cluster as described in claim 1, wherein the forming step further includes the steps of:

encoding an identifier of the destination processor node of the cluster in a header portion of the incoming packet of information, that identifier being an encoded identifier of the destination processor node; and the using step further includes the step of converting the header portion of the incoming packet of information to a header portion of an outgoing packet of information, and performing a connection registration overhead operation, whereby information regarding a connection that is associated with the plurality of related packets is stored in the connection registration database, after a predetermined amount of data is transferred from the destination node across the connection.

3. A method for providing data packet connections in a network cluster as described in claim 2 wherein the identifier of the destination node is encoded by the first processor in a sequence number field of the header portion of the incoming packet of information and in a sequence number field of the header portion of the outgoing packet of information.

4. A method for providing data packet connections in a network cluster as described in claim 3 wherein the sequence number field of the header portion of the outgoing packet of information is incremented by an amount of data transferred by the outgoing packet of information.

5. A method for providing data packet connections in a network cluster as described in claim 4 further including the step of:

decrementing a counter, associated with the destination processor node and initialized to a count that is equivalent to the predetermined amount of data, by the amount of data transferred by the outgoing packet of information; and storing information, regarding the connection that is associated with the plurality of associated packets, by the connection registration overhead operation in response to said counter reaching a count of zero.

6. A method for providing data packet connections in a network cluster as described in claim 2 further including the step of:

encoding a guard field adjacent to the encoded identifier of the destination processor node in the header portion of the incoming packet of information.

7. A method for providing data packet connections in a network cluster as described in claim 6 further including the steps of:

receiving a second one of the plurality of related packets of information, having a header portion associated with the outgoing packet of information;

determining, by the first processor node, whether the information regarding the connection has been stored by the connection registration overhead operation; and decoding the encoded identifier of the destination processor node from the header portion of the second one of the plurality of associated packets of information, in response to a determination that no information regarding the connection has been stored by the connection registration overhead operation.

8. A method for providing data packet connections in a network cluster as described in claim 7 further including the step of:

decoding, by the first processor node, the identifier of the destination processor node from the header portion of the second one of the plurality of related packets, in response to the guard field having a first value.

9. A method for providing data packet connections in a network cluster as described in claim 8 further including the step of:

transferring, by the first node, the second one of the plurality of related packets to the destination processor node for servicing.

10. A method for providing data packet connections in a network cluster as described in claim 9 further including the step of:

storing, in response to the guard field having a value within a predetermined range, the information regarding the connection by the connection registration overhead operation.

11. A method for providing data packet connections in a network cluster as described in claim 7 wherein the guard field, having a certain value, indicates that the predetermined amount of data has been transferred to the destination processor node over the connection.

12. A method for providing data packet connections in a network cluster as described in claim 7 including the steps of:

retrieving, the identifier of the destination processor node from a connection registration database associated with the connection registration overhead operation, in response to a determination that the information regarding the connection has been stored by the connection registration overhead operation.

13. A method for providing data packet connections in a network cluster as described in claim 2 wherein said plurality of related packets of information correspond to the TCP/IP protocol.

14. A computer program product for reducing a frequency of a connection registration overhead operation in a cluster having a plurality of system resources including processor nodes, each processor node including a memory and I/O circuitry through which the plurality of system resources are electrically connected and through which data packets can be exchanged with other clusters, the computer program product comprising a computer usable medium having computer readable program code thereon, including:

program code, for encoding an identifier of a processor node in a header portion of an incoming packet of information, sent from a client application to a cluster alias address associated with the processor node, such that information regarding a connection between the processor node and the client application is withheld from being stored in a connection registration data base until a predetermined amount of data has been sent across that connection; and program code for converting the header portion of the incoming packet of information to a header portion of an outgoing packet of information, sent from the processor node to the client application.

15. A computer program product according to claim 14 wherein the program code for encoding encodes the identifier of the processor node in a sequence number field of the header portion of the incoming packet of information.

16. A computer program product according to claim 15 further including:

program code for encoding a guard field adjacent to the encoded identifier of the processor node in the header portion of the incoming packet of information.

17. A computer system for providing data packet connections in a cluster including a plurality of processor nodes, comprising:

a client application for forming a data packet associated with a plurality of related data packets such that the data packet includes a cluster alias address for the cluster and an initial request for establishment of a connection to the cluster using the cluster alias address without specifying any one of the plurality of processor nodes as a destination and the data packet further includes an encoded identifier for indicating the selected destination processor node such that the receiving processor node can deliver each of the related data packets to the selected destination processor node without a connection registration overhead operation occurring until a predetermined amount of data is transferred from the client application across the connection, and for transmitting the data packet across a computer network; and a receiver processor node of the plurality of processor nodes, within the cluster, for receiving the data packet and for selecting a destination processor node of the plurality of processor nodes, within the cluster, for establishing the connection.

18. A computer system for providing data packet connections in a cluster, as described in claim 17 wherein the encoded identifier of the selected destination processor node is encoded by the receiver processor node in a sequence number field of a header portion of the data packet.

19. A computer system for providing data packet connections in a cluster, as described in claim 17 further comprising:

a guard field, encoded in a field that is adjacent to the encoded identifier of the selected destination processor node in the header portion of the data packet.

20. A computer system for providing data packet connections in a cluster, as described in claim 19 further comprising:

a connection registration database for storing information regarding the connection for the connection registration overhead operation in response to the guard field having a value within a predetermined range.

21. A computer system for providing data packet connections in a cluster, as described in claim *herein the guard field having a certain value within a predetermined range indicates that a predetermined amount of data has been transferred to the selected destination processor node over the connection.

22. A computer system for providing data packet connections in a cluster, as described in claim 21 wherein said plurality of related data packets correspond to the TCP/IP protocol.

23. A computer system for providing data packet connections in a cluster, as described in claim 22 further comprising:
   a counter, associated with the selected destination processor node and initialized to a count that is equivalent to the predetermined amount of data and being decremented each time that an amount of data is transferred from the selected destination processor node to the client application, for indicating when the guard field has the certain value and when the connection should be registered in the connection registration database.

24. A computer system for providing data packet connections in a cluster, as described in claim 17, wherein the encoded identifier is included in a data portion of the data packet.

25. A computer system for providing data packet connections in a cluster, as described in claim 17, wherein the encoded identifier is included in a field of the data packet header other than a sequence number field.

26. An apparatus for providing data packet connections in a network cluster including a plurality of processor nodes and a connection registration database, comprising:
   means for forming a data packet such that the data packet includes an indication of a destination processor node of the plurality of processor nodes in the network cluster;
   means for transmitting across a computer network, the formed data packet such that it serves as an incoming packet of information associated with a plurality of related packets of information to the network cluster;
   means for receiving the incoming packet of information by a first processor node of the plurality of processor nodes in the network cluster; and
   means for using, from the incoming packet of information, the indication of destination processor node to deliver the incoming packet of information from the first processor node to the destination processor node within the network cluster, in a manner such that the incoming packet of information and each of the related packets of information are delivered to the destination processor node without a connection registration overhead operation.

27. An apparatus for providing data packet connections in a network cluster as described in claim 26, further comprising:
   means for encoding an identifier of the destination processor node of the cluster in a header portion of the incoming packet of information, that identifier being an encoded identifier of the destination processor node; and
   means for converting the header portion of the incoming packet of information to a header portion of an outgoing packet of information, and performing a connection registration overhead operation, whereby information regarding a connection that is associated with the plurality of related packets is stored in the connection registration database, after a predetermined amount of data is transferred from the destination node across the connection.

28. An apparatus for providing data packet connections in a network cluster as described in claim 27 wherein the identifier of the destination node is encoded by the first processor in a sequence number field of the header portion of the incoming packet of information and in a sequence number field of the header portion of the outgoing packet of information.

29. An apparatus for providing data packet connections in a network cluster as described in claim 27, further comprising:
   means for encoding a guard field adjacent to the encoded identifier of the destination processor node in the header portion of the incoming packet of information.

* * * * *